2,770,661
PRODUCTION OF CHLORINATED COMPOUNDS

Theodore Horlenko, Frank B. Marcotte, and Oren V. Luke, Corpus Christi, Tex., assignors to Celanese Corporation of America, New York, N. Y., a corporation of Delaware No Drawing. Application August 11, 1953, Serial No. 373,685

8 Claims. (Cl. 260—658)

This invention relates to the production of chlorinated compounds and relates more particularly to the reaction of carbon tetrachloride with ethylene to produce a tetrachlorohydrocarbon.

As is known in the art, ethylene and carbon tetrachloride react under suitable conditions to produce a series of addition compounds according to the equation:

$$nC_2H_4 + CCl_4 \rightarrow Cl(C_2H_4)_nCCl_3$$

in which "$n$" is a relatively small whole number. Generally, a number of similar reactions take place simultaneously so that there is produced a mixture of homologous compounds, called telomers, having different values of $n$. It has been observed in the prior art that the reaction between the ethylene and carbon tetrachloride proceeds at a rate which is not reproducible from experiment to experiment. In fact, this rate may be so high, at times, that the reaction takes place with explosive violence.

It is therefore an object of this invention to provide a process for reacting ethylene and carbon tetrachloride at a readily controllable and high reproducible rate.

Other objects of this invention will appear from the following detailed description and claims.

According to the present invention the rate of reaction of ethylene and carbon tetrachloride may be controlled by first saturating the carbon tetrachloride with oxygen and then purging the saturated carbon tetrachloride with a gas for a predetermined period of time. It is found that the purged carbon tetrachloride may then be reacted with ethylene, under telomerization conditions, at a rate which is highly reproducible from experiment to experiment.

In one convenient method of carrying out the process of the present invention, a stream of air is bubbled through a body of carbon tetrachloride until the latter is saturated therewith, following which a stream of ethylene gas, preferably free of oxygen, is bubbled through the carbon tetrachloride to remove a portion of the dissolved air therefrom. Thereafter the purged carbon tetrachloride is reacted with ethylene under pressure in the known manner, for example, at a temperature of about 50° to 150° C., under a superatmospheric pressure of about 5 to 1000 atmospheres, and in the presence of a peroxygen compound or other substance which yields free radicals under the conditions of reaction. The speed of the reaction depends on the length of time the carbon tetrachloride has been purged with ethylene. Thus, under one set of conditions the reaction rate is slight when the carbon tetrachloride has been purged for 2 minutes, is rapid when the purging time is 20 minutes and is explosive when the purging time is 30 minutes. Since a controlled preliminary treatment removes the danger of explosions during the reaction, the reaction may be carried out in equipment of moderate strength without the need for extensive protection of personnel. Furthermore, since the reaction may be carried out without danger of explosion it is not necessary to add a diluent, such as water or an inert organic liquid, to the reactants, thus simplifying operational and purification procedures. In addition, the omission of water makes it possible to carry out the reaction more easily at lower temperatures. However, a diluent, such as an inert organic liquid in which carbon tetrachloride is soluble, may be employed if desired.

As stated, the temperature of the reaction between the ethylene and the carbon tetrachloride may be varied over a wide range. We have found, however, that the molecular weight distribution of the products of the reaction may be controlled by suitable regulation of the temperature. Thus, when the reaction temperature is 70° C., in one series of experiments, the major reaction product contains 5 carbon atoms, while when the reaction temperature is 145° C., all other conditions being the same, the predominating reaction product has 7 carbon atoms. We have also found that the yield of reaction products may be increased greatly by maintaining the temperature at a substantially uniform value. For example, 37% of the carbon tetrachloride present is converted to higher tetrahaloalkanes having three or more carbon atoms when the temperature of the reaction is maintained within the range of 90° to 95° C. throughout the reaction. In an otherwise identical experiment, in which the reaction temperature varies from 90° to 120° C. during the reaction, only 10% of the carbon tetrachloride is converted to higher tetrahaloalkanes. In addition, when the temperature is maintained substantially uniform, the pressure necessary to carry out the reaction is considerably lower.

In order to further illustrate the novel process of our invention, but without being limited thereto, the following example is given:

Example

Air is bubbled through a body of liquid carbon tetrachloride maintained at a temperature of 30° C. until the carbon tetrachloride is saturated, after which it is purged by bubbling oxygen-free ethylene through it for varying periods of time. The purged carbon tetrachloride is reacted with ethylene under a pressure of 800 pounds per square inch gauge, at a temperature maintained at 90 to 95° C., in the presence of 0.4% of benzoyl peroxide, based on the weight of the carbon tetrachloride, in an autoclave. During the course of the reaction ethylene is fed into the autoclave continuously so as to maintain the pressure thereof. It is found that the rate of reaction is dependent on the period of time for which the carbon tetrachloride was purged, as shown in the following table:

| Time of purging, Minutes | Reaction rate |
|---|---|
| 2 | Slight. Heating required to maintain reaction temperature. |
| 10 | Moderate. Occasional cooling required. |
| 20 | Rapid. Difficult to hold reaction temperature even with extensive cooling. |
| 30 | Explosive. Rapid increase of temperature and pressure, safety disc of autoclave ruptured. |

On repetition of the process of this example substantially identical results are obtained.

It is to be understood that the foregoing detailed description is given merely by way of illustration and that many variations may be made therein without departing from the spirit of our invention.

Having described our invention, what we desire to secure by Letters Patent is:

1. In the process for the production of addition products by the reaction of ethylene and carbon tetrachloride under pressure in the presence of free radicals, the improvement which comprises saturating the carbon tetrachloride with oxygen, then purging said saturated carbon tetrachloride with a gas for a predetermined period of time in order to remove a portion only of the oxygen therefrom, and then effecting the reaction of said purged carbon tetrachloride with ethylene.

2. In the process for the production of addition products by the reaction of ethylene and carbon tetrachloride under pressure in the presence of free radicals, the improvement which comprises saturating the carbon tetrachloride with oxygen, then purging said saturated carbon tetrachloride with ethylene for a predetermined period of time in order to remove a portion only of the oxygen therefrom and then effecting the reaction of said purged carbon tetrachloride with ethylene.

3. In the process for the production of addition products by the reaction of ethylene and carbon tetrachloride under pressure in the presence of free radicals, the improvement which comprises saturating the carbon tetrachloride with air, then purging said saturated carbon tetrachloride with a gas for a predetermined period of time in order to remove a portion only of the air therefrom and then effecting the reaction of said purged carbon tetrachloride with ethylene.

4. In the process for the production of addition products by the reaction of ethylene and carbon tetrachloride under pressure in the presence of free radicals, the improvement which comprises saturating the carbon tetrachloride with air, then purging said saturated carbon tetrachloride with ethylene for a predetermined period of time in order to remove a portion only of the air therefrom and then effecting the reaction of said carbon tetrachloride with ethylene.

5. In the process for the production of addition products by the reaction of ethylene and carbon tetrachloride under pressure in the presence of free radicals, the improvement which comprises saturating the carbon tetrachloride with oxygen, then purging said saturated carbon tetrachloride with a gas for a predetermined period of time in order to remove a portion only of the oxygen therefrom, and then effecting the reaction of said purged carbon tetrachloride with ethylene while maintaining the reaction temperature substantially constant.

6. In a process for the production of addition products by the reaction of ethylene and carbon tetrachloride under pressure in the presence of free radicals, the improvement which comprises saturating the carbon tetrachloride with air, then purging said saturated carbon tetrachloride with ethylene for a predetermined period of time in order to remove a portion only of the air therefrom and then effecting the reaction of said purged carbon tetrachloride with ethylene in the absence of a diluent while maintaining the reaction temperature substantially constant.

7. In the process for the production of addition products by the reaction of ethylene and carbon tetrachloride under pressure in the presence of free radicals, the improvement which comprises saturating the carbon tetrachloride with air, then purging said saturated carbon tetrachloride with ethylene for about 20 minutes in order to remove a portion only of the air therefrom and then effecting the reaction of said purged carbon tetrachloride with ethylene in the absence of a diluent.

8. In the process for the production of addition products by the reaction of ethylene and carbon tetrachloride under pressure in the presence of free radicals, the improvement which comprises saturating the carbon tetrachloride with air, then purging said saturated carbon tetrachloride with ethylene for about 20 minutes in order to remove a portion only of the air therefrom and then effecting the reaction of said purged carbon tetrachloride with ethylene in the absence of a diluent at a temperature of about 90° C., a pressure of about 800 pounds per square inch gauge in the presence of 0.2% of benzoyl peroxide as a catalyst.

References Cited in the file of this patent

UNITED STATES PATENTS

| | | |
|---|---|---|
| 2,440,800 | Hanford et al. | May 4, 1948 |
| 2,505,833 | Noether et al. | May 2, 1950 |